United States Patent
Worrell et al.

(10) Patent No.: US 6,584,537 B1
(45) Date of Patent: Jun. 24, 2003

(54) DATA-CACHE DATA-PATH

(75) Inventors: Frank Worrell, San Jose, CA (US); Gagan V. Gupta, Union City, CA (US)

(73) Assignee: LSI Logic Corporation, Milpitas, CA (US)

( * ) Notice: Subject to any disclaimer, the term of this patent is extended or adjusted under 35 U.S.C. 154(b) by 281 days.

(21) Appl. No.: 09/731,476

(22) Filed: Dec. 6, 2000

(51) Int. Cl.$^7$ .............................................. G06F 13/00
(52) U.S. Cl. ...................................... 710/310; 711/133
(58) Field of Search ................................. 710/305, 306, 710/310, 311; 370/402; 711/133

(56) References Cited

U.S. PATENT DOCUMENTS 6,314,486 B1 * 11/2001 Schulz et al. ............... 710/130
6,405,273 B1 * 6/2002 Fleck et al. ................. 710/131

OTHER PUBLICATIONS

Non–intrusive On–chip Debug Hardware Accelerates Development for MIPS RISC Processors, By Morten Zilmer, MIPS EJTAG Technical Article, pp. 1–6.
MIPS EJTAG Debug Solution, Rev. 2.0.0, 1997, pp. 1–122.

* cited by examiner

Primary Examiner—David L. Robertson
(74) Attorney, Agent, or Firm—Christopher P. Maiorana, PC

(57) ABSTRACT

A circuit that may comprise a data-cache memory and a data-path circuit. The data-cache memory may be configured to (i) store a cache input data item among a plurality of associative sets and (ii) present a plurality of cache output data items. The data-path circuit may be configured to (i) independently shift each of the plurality of cache output data items and (ii) multiplex the plurality of shifted cache output data items to present an output data item.

18 Claims, 2 Drawing Sheets

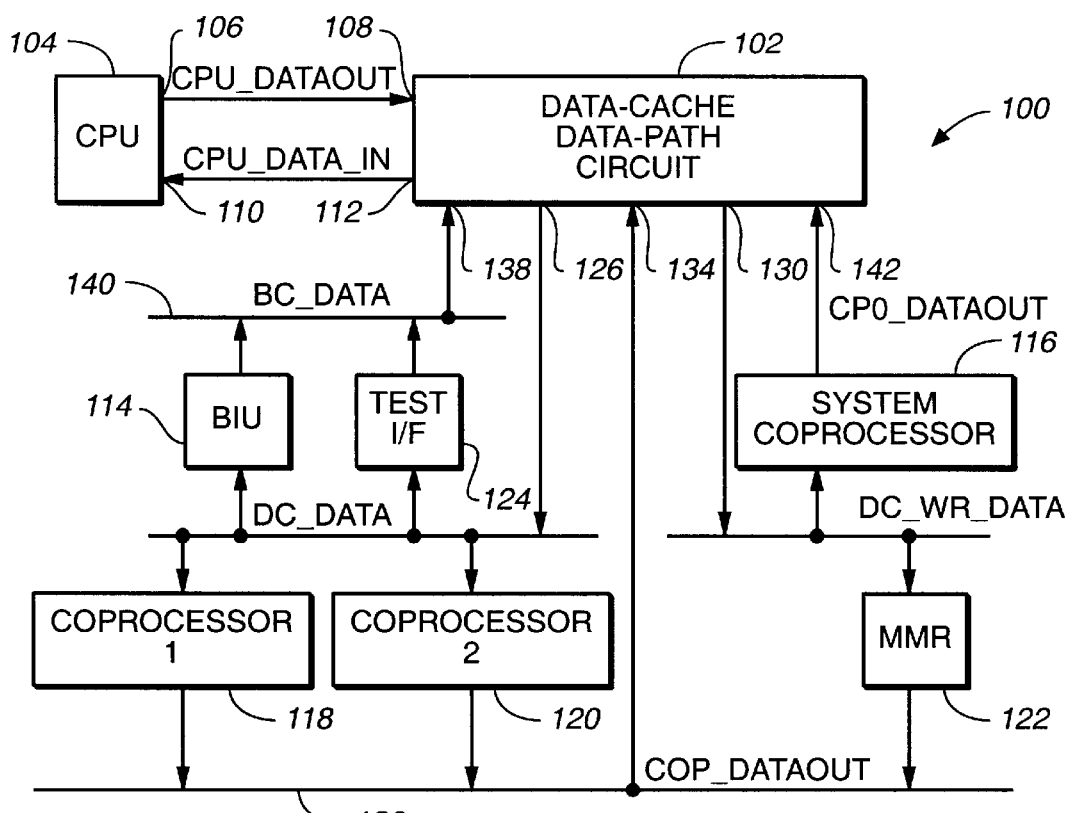
FIG._1
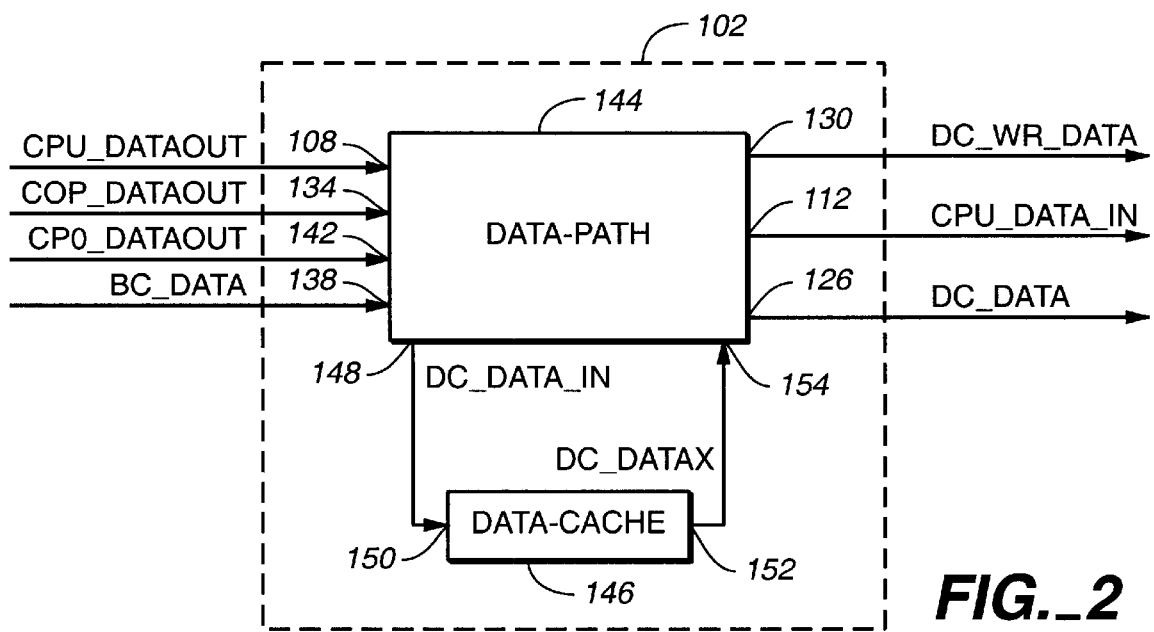
FIG._2

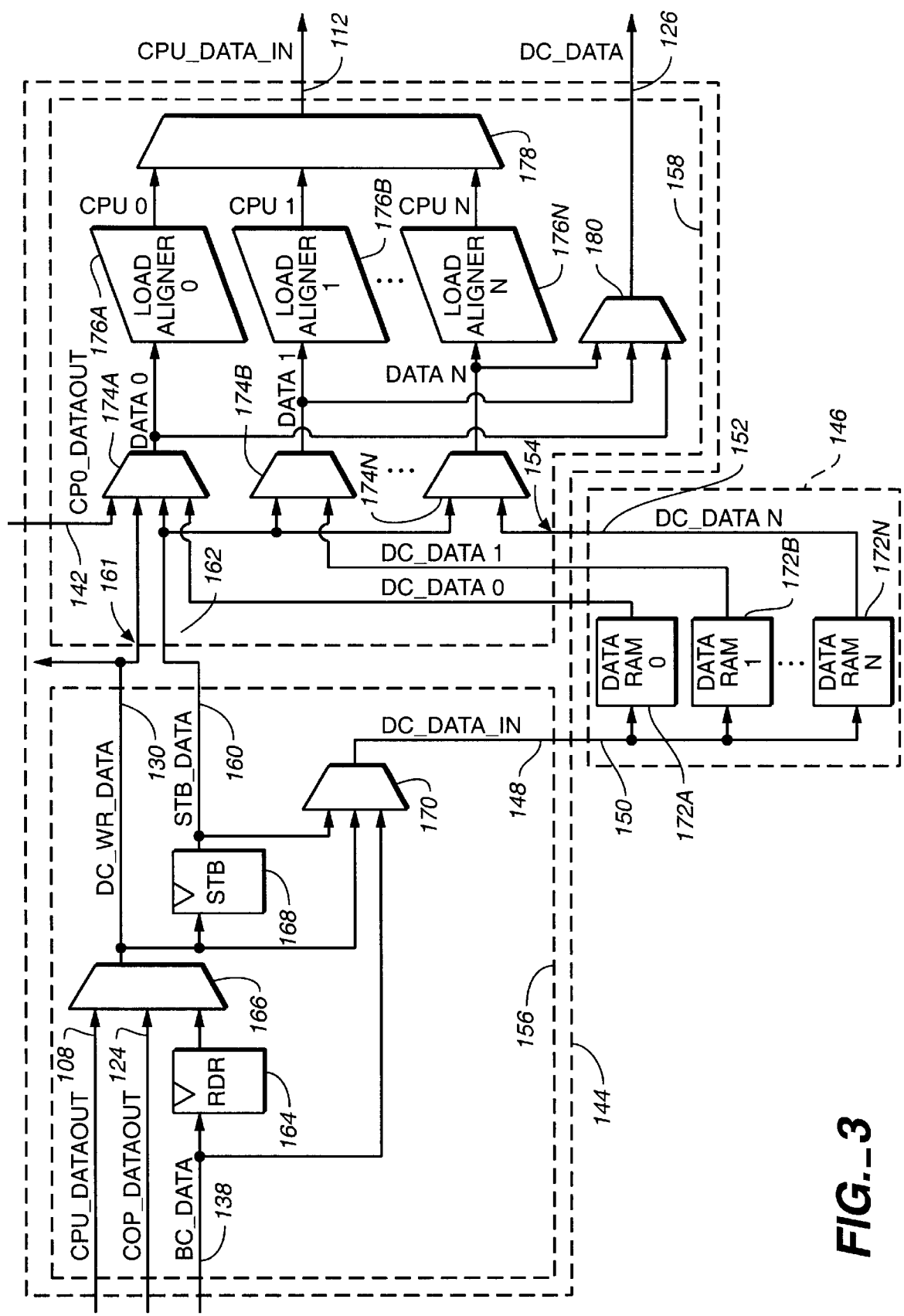
FIG._3

DATA-CACHE DATA-PATH

FIELD OF THE INVENTION

The present invention relates to a pipelined processor generally and, more particularly, to a data-path for a data-cache within the processor.

BACKGROUND OF THE INVENTION

Performance of a pipelined processor is determined in part by the speed at which data is moved through the memory stage of a data pipeline. A basic operation of the memory stage is to store and load data to and from a data-cache memory. A specific operation of a data-path associated with the data-cache memory includes byte-aligning or shifting the data for presentation to a central processor unit. Other specific operations of the data-path include driving a local data bus and gathering data from multiple sources for presentation to the data-cache memory. Each of the above operations has a potential to introduce delays that can ultimately affect the performance of the pipelined processor.

The architecture of the data-path before and after the data-cache memory influences the performance of the memory stage of the data pipeline. The data-path leading into the data-cache memory can degrade performance by presenting the data such that each store operation constrains access to the data-cache memory for multiple run cycles. The data-path following the data-cache memory can also degrade performance by delaying presentation of data read from the data-cache memory to other devices within the processor.

SUMMARY OF THE INVENTION

The present invention concerns a circuit comprising a data-cache memory and a data-path circuit. The data-cache memory may be configured to (i) store a cache input data item among a plurality of associative sets and (ii) present a plurality of cache output data items. The data-path circuit may be configured to (i) independently shift each of the plurality of cache output data items and (ii) multiplex the plurality of shifted cache output data items to present an output data item.

The objects, features and advantages of the present invention include providing a method and/or architecture for implementing a data-cache data-path that may (i) improve the cycle time at which data can be stored in the data-cache memory; (ii) improve the cycle time at which data read from the data-cache memory can be presented to other devices; and/or (iii) eliminate false long paths that complicate timing analysis of the data-path.

BRIEF DESCRIPTION OF THE DRAWINGS

These and other objects, features and advantages of the present invention will be apparent from the following detailed description and the appended claims and drawings in which:

FIG. 1 is a block diagram illustrating a processor implementing a preferred embodiment of the present invention;

FIG. 2 is a block diagram of a circuit implementing a data-cache data-path; and

FIG. 3 is a more detailed block diagram of the present invention.

DETAILED DESCRIPTION OF THE PREFERRED EMBODIMENTS

Referring to FIG. 1, a block diagram illustrating a processor 100 implementing a preferred embodiment of the present invention is shown. The processor 100 generally comprises a circuit 102 and a central processing unit (CPU) 104. The circuit 102 may be a data-cache data-path. The circuit 102 is generally configured to (i) shift, (ii) present, and (iii) store the data items to and from the CPU 104. The CPU 104 may be configured to (i) receive data items, (ii) execute the data items, and (iii) present the resulting data items. The term "data item" may be used in a generic sense in this document. A data item may include, but is not limited to information, control, data, signal, trigger, value, parameter, operator, operand, and the like.

The CPU 104 may have an output 106 that may connect to an input 108 of the circuit 102 through a CPU data output bus (e.g., CPU_DATAOUT). The CPU 104 may also have an input 110 that may connect to an output 112 of the circuit 102 through a CPU data input bus (e.g., CPU_DATA_IN). The CPU_DATAOUT bus may contain data items presented by the CPU 104. The CPU_DATA_IN bus may contain data items presented by the circuit 102.

The processor 100 may comprise a number of circuits other than the CPU 104 that require access to the circuit 102 to store and receive data. For example, the processor 100 may comprise, but is not limited to, one or more of a bus interface unit (BIU) 114, a system coprocessor 116, a first coprocessor 118, a second coprocessor 120, one or more memory mapped registers (MMR) 122, and a test interface 124. The system coprocessor 116 may be referred to as a coprocessor zero (CP0). The test interface 124 may be, in one example, a boundary scan test interface in accordance with the Enhanced Joint Test Action Group Standard IEEE-1149.1 (published by the Institute of Electrical and Electronics Engineering, Inc., New York, N.Y.), the relevant portions of which are incorporated by reference.

The circuit 102 may have an output 126 that may connect to a data-cache data output bus (e.g., DC_DATA). The DC_DATA bus may contain output data items presented by the circuit 102. The circuit 102 may also have another output 130 that may connect to a data-cache write data output bus (e.g., DC_WR_DATA). The DC_WR_DATA bus may contain data-cache write data items presented by the circuit 102.

In conventional designs, the DC_DATA bus generally routes the output data items to the other circuits 114–124. In a preferred embodiment of the present invention, the DC_DATA bus routes the output data items only to the bus interface unit 114, the first coprocessor 118, the second coprocessor 120, and/or the test interface 124. The DC_WR_DATA bus may route the data-cache write data items to the system coprocessor 116 and/or the memory mapped registers 122. The presence of the DC_WR_DATA bus generally helps unload the DC_DATA bus. The combination of the DC_DATA bus and the DC_WR_DATA bus may disseminate data items from the circuit 102 faster than the DC_DATA bus alone.

The circuit 102 may have an input 134 that may connect to a coprocessor data output bus (e.g., COP_DATAOUT). The COP_DATAOUT bus may contain input data items presented to the circuit 102 by the first coprocessor 118, the second coprocessor 120, and/or the memory mapped registers 122. The circuit may also have another input 138 that may connect to a bus control data bus (e.g., BC_DATA). The BC_DATA bus may contain write data items presented to the circuit 102 by the bus interface unit 114 and/or the test interface 124. The circuit 102 may have still another input 142 connected to a coprocessor zero data output bus (e.g., CP0_DATAOUT). The CP0_DATAOUT bus may contain other input data items presented to the circuit 102 by the system coprocessor 116. In a preferred embodiment, data items presented by the system coprocessor 116 are not ordinarily stored by the circuit 102. The circuit 102 generally routes the data items to the output 112 and/or the output 126 where the data items are presented on the CPU_DATA_IN bus and/or the DC_DATA bus.

Referring to FIG. 2, a block diagram illustrating an implementation of the circuit 102 is shown. The circuit 102 may comprise a data-path circuit 144 and a data-cache memory 146. The data-path circuit may have an output 148 that may connect to an input 150 of the data-cache 146 through a data-cache data input bus (e.g., DC_DATA_IN). The DC_DATA_IN bus may contain data-cache input data items presented by the data-path circuit 144 for storage in the data-cache memory 146. The data-path circuit may have inputs 154 that may connect to outputs 152 of the data-cache 146 through data-cache data buses (e.g., DC_DATAX). The DC_DATAX bus may contain data-cache output data items presented by the data-cache 146 to the data-path circuit 144.

The data-path circuit 144 may be configured to present the data items received via the CPU_DATAOUT, COP_DATAOUT, and BC_DATA buses to the data-cache memory 146 via the DC_DATA_IN bus. The data-path circuit 144 may also be configured to present the data items carried by the CPU_DATAOUT, COP_DATAOUT, CP0_DATAOUT, BC_DATA, and DC_DATAX buses outside the circuit 102 via the DC_WR_DATA, CPU_DATA_IN, and DC_DATA buses. The circuit 144 may be configured to shift or align the data items before presentation on the CPU_DATA_IN bus. The data-cache memory 146 is generally configured to (i) store data items presented by the data-path circuit 144 and (ii) present data items to the data-path circuit 144 as required.

The outputs 152, the inputs 154 and the DC_DATAX buses may comprise one or more independent paths between the data-cache memory 146 and the data-path circuit 144. In a preferred embodiment, the data-cache memory 146 is configured as two-way set associative. When the data-cache memory 146 is two-way set associate, the data-cache memory 146 may be configured to present two data-cache data output buses (e.g., DC_DATA0 and DC_DATA1) at the outputs 152. The DC_DATA0 and DC_DATA1 buses may contain data items presented by each respective associative set of the data-cache memory 146. However, other configurations of the data-cache memory 146 may be implemented to meet the design criteria of a particular application. For example, the data-cache memory 146 may be configured as a direct mapped cache requiring one data-cache output bus. In a general embodiment, the data-cache memory 146 may be arranged as multiple-way set associative having N associative sets, where N is an integer. In the general case, the data-cache memory 146 may be configured to present the DC_DATAX bus as N data-cache output buses (e.g., DC_DATA0-N). In the general case, the circuit 146 may be implemented with N independent outputs 152 and the data path 144 may be implemented with N independent inputs 154.

Referring to FIG. 3, a more detailed block diagram illustrating an example of the circuit 102 is shown. The data-path circuit 144 may comprise an input circuit 156 and an output circuit 158. The data-cache memory 146 may comprise a number of data random access memory (RAM) sets 172A–172N. The data RAMs 172A–172N may be configured as multiple-way set associative in the embodiment shown in FIG. 3.

The CPU_DATAOUT, COP_DATAOUT, and BC_DATA buses may present data items to the input circuit 156. The input circuit 156 may be configured to present data items on the DC_WR_DATA bus, the DC_DATA_IN bus, and a store buffer data bus (e.g., STB_DATA). The input circuit 156 generally buffers and multiplexes the data items received on the CPU_DATAOUT, COP_DATAOUT, and BC_DATA buses. The buffered and multiplexed data items may then presented on the DC_WR_DATA, DC_DATA_IN, and STB_DATA buses. The DC_WR_DATA, STB_DATA, and DC_DATA_IN buses may connect to the output 130, the output 160, and the output 148 respectively of the input circuit 156.

The CP0_DATAOUT, DC_WR_DATA, DC_DATA0–N, and STB_DATA buses may present data items to the output circuit 158. The output circuit 158 generally multiplexes and/or shifts the data items received on the CP0_DATAOUT, DC_WR_DATA, DC_DATA0–N, and STB_DATA buses. The multiplexed and shifted data items may then be presented on the CPU_DATA_IN and DC_DATA buses. The CP0_DATAOUT, DC_WR_DATA, DC_DATA0–N, and STB_DATA buses may connect to the input 142, the input 161, the input 154, and the input 162 respectively of the output circuit 158.

The input circuit 156 may comprise a read data register (RDR) 164, a read data multiplexer 166, a store buffer register (STB) 168, and a store data multiplexer 170. The read data register 164 and the read data multiplexer 166 may provide general control of the DC_WR_DATA bus. The read data register 164 may buffer and delay write data items from the BC_DATA bus one cycle. Delaying the buffered write data items one cycle may allow for write data items presented by the bus interface unit 114 to be sent to the CPU 104 in parallel with refill writes to the data-cache memory 146.

The read data multiplexer 166 generally selects data items from among the CPU_DATAOUT bus, the COP_DATAOUT bus, and the buffered write data items from the BC_DATA bus. The read data multiplexer 166 may have an output that may present data items on the DC_WR_DATA bus. From this position of the data-path circuit 144, the DC_WR_DATA bus may eliminate false long paths through the data-cache memory 146 and/or the output circuit 158 that complicate timing analysis.

The store buffer register 168 and the store data multiplexer 170 may provide general control of the DC_DATA_IN bus. The store buffer register 168 may provide buffering of data items from the DC_WR_DATA bus for presentation on the STB_DATA bus. The STB_DATA bus generally allows particular data items to be presented at the outputs 112 and/or 126 of the circuit 102 before the data-cache memory 146 stores the particular data items. The store data multiplexer 170 generally selects data items from among the BC_DATA, DC_WR_DATA and STB_DATA buses for presentation on the DC_DATA_IN bus.

The data-cache memory 146 may comprise one or more sets of RAM 172. An application requiring a direct mapped cache configuration may require only one set of RAM 172. Other applications requiring a multiple-way set associative cache configuration preferably have two to eight or more sets of RAM 172. A variety of technologies may be employed in implementing the RAMs 172 within the data-cache memory 146. Typically the RAMs 172 are static synchronous devices having four or six transistor cells. Asynchronous type RAMs 172 may also be used, as well as dynamic RAMs 172 having a variety of cell configurations. However, other types of memory elements may be implemented to meet the design criteria of a particular application.

In a preferred embodiment, the data-cache memory 146 is configured as two-way set associative and has two sets of data RAMs 172A–B. FIG. 3 generally illustrates a generic N-way set associative configuration having N sets of data RAMs 172A–N, where N is an integer. Direct mapped configurations may also be employed as appropriate to meet the design criteria of a particular application.

The output circuit 158 may comprise one or more multiplexers 174A–N, one or more load aligners 176A–176N, an output multiplexer 178, and an output multiplexer 180. The multiplexers 174A–N may select which data items are routed to the outputs 112 and 126. Each multiplexer 174A–N may provide for data item selection between the STB_DATA bus and at least one of the DC_DATA0–N buses. Each multiplexer 174A–N may have an output that may present data items on a respective output bus (e.g., DATA0–N) A predetermined multiplexer (e.g., the first multiplexer 174A) may also have inputs that may receive data items from the CP0_DATAOUT and/or DC_WR_DATA buses.

Each of the load aligners 176A–N may have an input that may receive data items from one of the DATA0–N buses. Each load aligner 176A–N may be configured to independently perform a shift operation on the data items of the respective DATA0–N bus. The shift operations are generally made in units of one byte. However, shift operations of multiple bytes, multiple bits, or single bits may be implemented accordingly to meet the design criteria of a particular implementation. The load aligners 176A–N may also be configured to feed-through data items from the DATA0–N buses unshifted when programmed accordingly. The load aligners 176A–N may have an output that may present the shifted/unshifted data items from the DATA0–N buses on output buses (e.g., CPU0–N ), respectively.

The CPU0–N buses may present the data items to the output multiplexer 178. The output multiplexer 178 is generally configured to route data items from one of the CPU0–N buses to the CPU_DATA_IN bus. Data items from any associative set of the data-cache memory 146, the bus interface unit 114, the system coprocessor 116, the coprocessor 118, the coprocessor 120, the memory mapped registers 122, the test interface 124, or even the CPU 104 may be presented to the CPU 104 through the output multiplexer 178.

Modeling of various configurations of the load aligners 176A–N and the output multiplexer 178 has concluded that incorporating multiple load aligners 176A–N generally enhances circuit delay. By way of example, a model placing the output multiplexer 178 between the multiplexers 174A–N and a single load aligner 176A generally did not perform as well as another model placing two load aligners 176A–B between the multiplexers 174A–B and the output multiplexer 178.

The output multiplexer 180 may be provided to present data items that do not require shift operations. The output multiplexer 180 may be configured to route data items from one of the DATA0–N buses to the DC_DATA bus. Data items from any associative set of the data-cache memory 146, the CPU 104, the bus interface unit 114, the system coprocessor 116, the coprocessor 118, the coprocessor 120, the memory mapped registers 122, and the test interface 124 may be presented through the output multiplexer 180.

The present invention may be implemented by the preparation of ASICs, FPGAs, or by interconnecting an appropriate network of conventional components circuits that will be readily apparent to those skilled in the arts.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
    a cache memory configured to (i) store a cache input data item among a plurality of associative sets and (ii) present a plurality of cache output data items; and
    a data-path circuit configured to (i) independently shift each of said plurality of cache output data items and (ii) multiplex said plurality of cache output data items after said shift to present an output data item.

2. The circuit according to claim 1, wherein said data-path circuit is further configured to multiplex said plurality of cache output data items to present a second output data item.

3. The circuit according to claim 1, wherein said data-path circuit is further configured to:
    buffer a cache write data item to present a buffered data item; and
    multiplex said cache write data item with said buffered data item to present said cache input data item.

4. The circuit according to claim 3, wherein said data-path circuit is further configured to multiplex said buffered data item with said plurality of cache output data items prior to said shift.

5. The circuit according to claim 3, wherein said data-path circuit is further configured to multiplex an input data item with a predetermined one of said plurality of cache output data items prior to said shift.

6. The circuit according to claim 3, wherein said data-path circuit is further configured to present said cache write data item as a second output data item.

7. The circuit according to claim 3, wherein said data-path circuit is further configured to:
    buffer a write data item to present a buffered write data item;
    multiplex said buffered write data item with an input data item to present said cache write data item; and
    multiplex said write data item with said cache write data item and said buffered data item to present said cache input data item.

8. The circuit according to claim 7, wherein said data-path circuit is further configured to multiplex a second input data item with said buffered write data item and said input data item to present said cache write data item.

9. The circuit according to claim 3, wherein said data-path circuit is further configured to:
    multiplex said buffered data item with said plurality of cache output data items prior to said shift;
    buffer a write data item to present a buffered write data item;
    multiplex said buffered write data item with an input data item and a second input data item to present said cache write data item;
    multiplex said write data item with said cache write data item and said buffered data item to present said cache input data item;
    multiplex a third input data item and said cache write data item with a predetermined cache. output data item of said plurality of cache output data items prior to said shift;
    present said cache write data item as a second output data item; and multiplex said plurality of cache output data items to present a third output data item.

10. A method for improving a data transfer delay for a cache memory comprising the steps of:

(A) storing a cache input data item in said cache memory;

(B) independently shifting each of a plurality of cache output data items from said cache memory; and (C) multiplexing said plurality of cache output data items in response to step (B) to present an output data item.

11. The method according to claim 10, further comprising the step of:

multiplexing said plurality of cache output data items prior to step (B) to present a second output data item.

12. The method according to claim 10, further comprising the steps of:

buffering a cache write data item to present a buffered data item; and multiplexing said cache write data item with said buffered data item to present said cache input data item.

13. The method according to claim 12, further comprising the step of:

multiplexing said buffered data item with said plurality of cache output data items prior to step (B).

14. The method according to claim 12, further comprising the step of:

multiplexing an input data item with a predetermined one of said plurality of cache output data items prior to step (B).

15. The method according to claim 12, further comprising the step of:

presenting said cache write data item as a second output data item.

16. The method according to claim 12, further comprising the steps of:

buffering a write data item to present a buffered write data item;

multiplexing said buffered write data item with an input data item to present said cache write data item; and multiplexing said write data item with said cache write data item and said buffered data item to present said cache input data item.

17. The method according to claim 16, further comprising the step of:

multiplexing a second input data item with said buffered write data item and said input data item to present said cache write data item.

18. A circuit comprising:

means for caching a cache input data item;

means for independently shifting each of a plurality of cache output data items from said means for caching; and means for multiplexing said plurality of cache output data items to present an output data item in response to said means for independently shifting.

* * * * *